April 18, 1950 R. E. SCHOCK 2,504,884
SIGNAL GATING SYSTEM
Filed Sept. 18, 1946 2 Sheets-Sheet 1

INVENTOR
Robert E. Schock
BY
H. S. Grover
ATTORNEY

INVENTOR
Robert E. Schock
BY
H. S. Grover
ATTORNEY

Patented Apr. 18, 1950

2,504,884

UNITED STATES PATENT OFFICE 2,504,884

SIGNAL GATING SYSTEM

Robert E. Schock, Riverhead, N. Y., assignor to Radio Corporation of America, a corporation of Delaware Application September 18, 1946, Serial No. 697,668

3 Claims. (Cl. 250—20)

Figure 1:
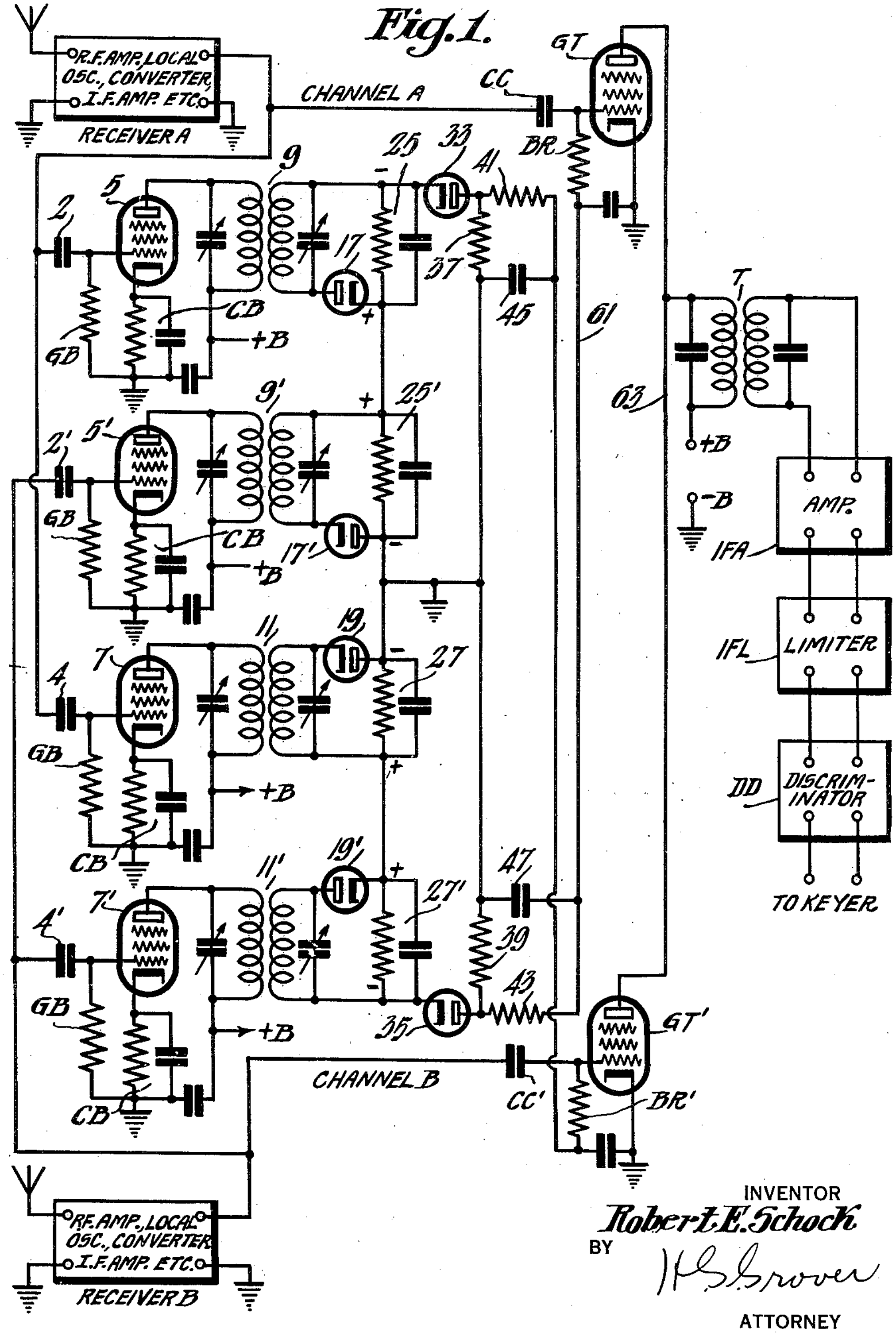

This application relates to telegraphy, facsimile and the like signaling systems and more in particular, to frequency shift, telegraph, facsimile and so forth receivers in space diversity.

Telegraphy, facsimile, and the like systems, making use of the frequency shift type of modulation are known in the art and different modes of such signaling are practiced by applicant's assignee. In these systems, alternating current has its frequency shifted from at first value which might represent "mark" in telegraphy or "white" in facsimile to a second value which might represent "space" in telegraphy or "black" in facsimile. These currents may be of high frequency and transmitted directly, or of lower frequency, in which case they may take the form of modulation of higher frequency waves. At the receiver, the frequency shifted current is subjected to a demodulation process to derive other currents, for example, current having a strong direct component which shifts in magnitude between two values, one of which represents "mark" or "white" and the other of which represents "space" or "black." In these systems, the derived currents are used to operate directly or indirectly, in many cases by way of tone keyers, recording apparatus of some type, for example, teletypewriters. Arrangements of this general nature are shown in Schock application #632,978, filed December 5, 1945, and Peterson et al. application #629,298, filed November 17, 1945, now Patent #2,494,309, dated January 10, 1950.

In the diversity systems referred to hereinbefore, the transmitted currents are compared at the receiver as to strength or signal quality and to do so are subjected to a signal strength sensing operation wherein the best of the two signals is selected and used for recording purposes. The general object of the present invention is improved signal strength or signal quality sensing to insure that the best of the received signals may be used at all times.

In the receiver of U. S. application #632,978, gating tubes are used to make available for recording or other use, the best signal only and for blocking off the remaining signals. In the said application, the gating tubes are in a sense differential and are differentially controlled by a locking circuit arrangement set into operation by a potential which may be said to represent the difference in magnitude or quality of the several signal versions in the space diversity system. The locking circuit is controlled by a potential derived from the signal sensing or comparing means.

An object of the present invention is improved means for sensing or comparing the several signal versions and for deriving by comparison thereof a controlled potential or potentials which designates by magnitude or polarity which version of the signal is of the best strength or quality.

Another object of the invention is an improved arrangement for controlling the gating tubes in accordance with the said derived potentials, to pass on to the recording apparatus only that signal which is of the best strength or quality.

Figure 2:
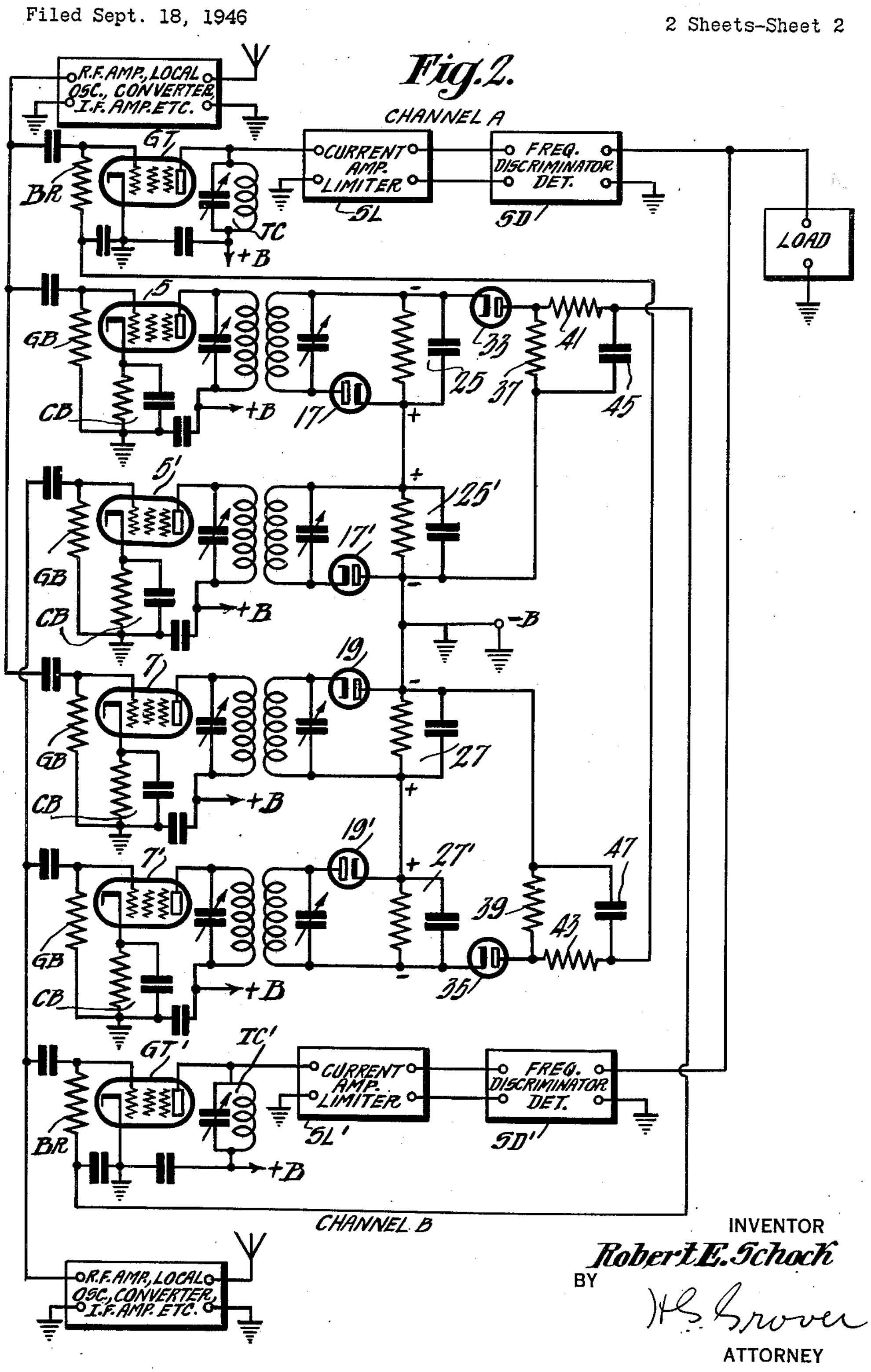

In describing my invention, reference will be made to the attached drawings, wherein:

Figs. 1 and 2 each illustrate a different embodiment of a signal strength comparing system and signal gating system arranged in accordance with my invention.

In Fig. 1, the signals supplied to the gating tubes are of IF frequency and the gating tubes supply output to a common voltage amplifier, current amplitude limiter, discriminator and detector chain.

In Fig. 2, separate amplitude limiters, discriminators and detectors are coupled to the gating tubes so that the detected outputs are supplied by common circuits to the recording apparatus.

In the system disclosed in Fig. 1, two receivers are used and designated herein as receivers A and B. Each of the receivers may comprise a radio frequency amplifier, a local oscillator, converting means and intermediate frequency amplifiers. The receiver outputs, which are of intermediate frequency, are supplied to channels A and B, respectively. The intermediate frequency energy in channel A which is shifted in frequency as described above in accordance with signals, is supplied by a coupling condenser CC to the control grid of the gate tube GT. The anode of tube GT is coupled to the primary winding of a transformer T. The secondary winding of the transformer T is coupled to an IF amplifier IFA which is in turn coupled to an amplitude limiter IFL supplying limited output to a discriminator and detector DD which may feed its keyed output to a tone keyer operating recording apparatus or more directly to recording apparatus. Receiver B in like manner, feeds intermediate frequency energy through coupling condenser CC' to a gate tube GT', the output of which is in parallel with the output of gate tube GT.

The signal strength or quality sensing means of my invention will now be described. Frequency shifted IF energy from receiver A on channel A is also supplied by coupling condensers 2 and 4 in parallel to the first or control grids of a pair of amplifier tubes 5 and 7. The tubes 5 and 7 have their cathodes coupled to ground by the usual biasing resistors which are shunted by IF bypass condensers. These units are labeled CB in the drawings. The control grids of the tubes are connected to ground by grid biasing resistors GB. The anode of tube 5 is coupled with the primary winding of an IF transformer 9, the secondary winding of which is connected in a rectifier circuit including a diode 17 and a load impedance including a resistor and a condenser in parallel comprising load unit 25. Tube 7 has its anode coupled in a somewhat similar manner by transformer 11, diode 19 and load unit 27. However, it will be noted that the polarities of the diodes 17 and 19 are relatively reversed.

Channel B supplies excitation in parallel, by coupling condensers 2′ and 4′, to the control grids of tubes 5′ and 7′. The anodes of these tubes are coupled by tuned transformers 9′ and 11′ to rectifiers 17′ and 19′ having as output impedances, load unit 25′ and load unit 27′. Here again, it is noted that the polarities of the diodes 17′ and 19′ are relatively reversed.

As is known, when the amplifier 5 is excited, rectified current will flow through the resistor of load 25 in a direction such that the end of this resistor adjacent the cathode of the rectifier 17 will be positive and the end of the resistor adjacent the anode of the rectifier will be negative. This also places the negative terminal of the load resistor adjacent the cathode of tube 33. The load unit 25 is in series with a load unit 25′ grounded at the anode end of rectifier 17′. When the amplifier 5′ is excited, the current flow through the resistor of load 25′ is, with respect to the current flow in load unit 25, in an opposite direction.

The load resistors 27 and 27′ are similarly arranged so that the currents therethrough oppose as do the potentials thereacross. The adjacent terminals of the loads 25′ and 27 are grounded. The outer ends of the series connected loads are coupled to the cathodes of coupling diodes 33 and 35. The anodes of the coupling diodes are connected together by resistors 37 and 39 and the adjacent ends of these resistors are connected to ground. The anode of diode 33 is also connected by resistor 41 and grid biasing resistor BR′ to the control grid of the gating tube GT′. The anode of coupling diode 35 is coupled by resistor 43 and biasing resistor BR to the control grid of gating tube GT. Resistors 41 and 37 are shunted by bypassing condenser 45 while resistors 39 and 43 are shunted by bypassing condenser 47. Resistor 37 completes the D. C. path of diode 33 and normally is made high compared to the two resistors of load units 25 and 25′ in series; so these load units are not loaded down by resistor 37 through diode 33. Resistor 41 and condenser 45 constitute a filter to remove any frequencies above signal frequency which might not have been removed by the condensers of the load units. The values of resistor 41 and condenser 45 may be adjusted to effect a slow time constant if it is found desirable to slow up the gating action. The same may be said of resistors 39, 43 and condenser 47.

The transformers 9, 9′, 11 and 11′ are broadly tuned to the mean frequency of the frequency shifted intermediate frequency energy supplied to the grids of tubes 5, 5′, 7 and 7′. The transformer band pass characteristics are broad and flat so that all of the signal frequencies are passed to the rectifiers 17, 17′, 19 and 19′ without material attenuation. The condensers of units 25, 25′, 27 and 27′ are big enough to suppress all rectified components of frequencies above signal frequency and higher so that the potentials across units 25, 25′, 27 and 27′ vary in accordance with the signal magnitudes. Filter circuit comprising resistor 41 and condenser 45 is to remove any frequencies above signal frequency not already removed by the load circuit condensers. The same applies to resistor 43 and condenser 47.

The outputs of diodes 17 and 17′ are differential and are representative of signal energy from channel A and channel B respectively so that in these diode rectifier circuits, the strengths of the signals from channel A and channel B are opposed to leave for use on the cathode of diode 33, a potential which is negative if the signal in channel A is strongest, and is positive if the signal in channel A is the weakest. Diodes 19 and 19′ have their load impedances 27 and 27′ connected differentially or in opposed polarity and are excited respectively by signals from channel A and channel B. The arrangement is such that if channel B is strongest, the potential on the cathode of diode 35 is negative and this potential becomes positive if the signal on channel A becomes stronger.

The tubes GT and GT′ are normally biased to be conductive (disregarding the functions of tubes 33 and 35 for the time being) so that they both would then amplify the frequency shifted signals and pass them along from both channels to transformer T. However, when the signal in channel A becomes materially stronger than the signal in channel B, the potential drop across load 25 predominates and the negative potential on the cathode of one way valve 33 grows. When the potential on the cathode of diode 33 becomes sufficiently negative, current flows in this diode to produce across resistance 37, a potential which swings down or becomes more negative to cut-off gate tube GT′ and prevent signal from channel B, then supply the poorest signal, from reaching the common output transformer T. Since we have assumed channel A to have the strongest signal, the differential output of rectifiers 19 and 19′ as applied to the cathode of tube 35 will be positive. However, since only negative potential can pass diode 35, the grid of the gate tube GT receiving the signal from channel A remains at normal bias and this tube passes its signal to the transformer T.

Thus, the stronger signal in channel A is utilized while that of channel B is rejected. When the signal in receiver B becomes stronger than the signal in the receiver A, the potential polarities reverse and the tube GT′ supplies output while the tube GT is cut off.

An important feature of my invention is the use of the diodes 33 and 35 arranged to pass negative potential only. That is, tubes 33 and 35 are only operative to pass negative potentials supplied to the cathodes thereof, thus allowing the gate tube GT or GT′ carrying the stronger signal to remain at a fixed unvarying bias.

In the arrangement of Fig. 1, the signals on the two channels as supplied to the gating tubes are of intermediate frequency, the output from the gating tubes being supplied to a common channel starting with transformer T and including the discriminator and detector DD which operates to demodulate signals from the channel having the strongest signal. The arrangement of Fig. 2 is similar to the arrangement of Fig. 1 except in this respect. The channels A and B are separate and distinct until demodulation takes place and then the selected demodulator output is supplied by a common path to recording or keying means. More specifically, the gating tubes GT and GT' supply output to tuned circuits TC and TC' coupled to separate current amplitude limiters SL and SL' and separate detectors SD and SD'. The signal strength comparing circuits are the same as those of Fig. 1 and will not be described again in detail. The components of the signal strength comparing amplifiers and rectifiers have been designated by reference numerals and characters corresponding to those used in Fig. 1.

What is claimed is:

1. In apparatus to compare the strengths of two complex currents which are representative of two different versions of the same signal, a gate tube for each version of said signal, a control grid in each gate tube excited by one only of said versions of said signal, two pairs of rectifiers, each pair having differentially connected load impedances, connections for applying voltages representative of each current to a different rectifier of each pair to produce across the differential load impedances of each pair of rectifiers a potential the polarity of which depends on which current is stronger, and a one way valve coupling the differentially connected load impedances of each pair of rectifiers to the control grid of a different one of said gate tubes.

2. In apparatus to compare the strengths of two complex currents which are representative of spaced versions of the same signal, a gate tube for each current, each gate tube having a control grid excited by one only of said spaced versions of said signal, two pairs of rectifiers, each pair having differentially connected load impedances connected therewith, connections for applying voltages representative of each current to a different rectifier of each pair to produce across the differential load impedances of each pair a resultant potential the polarity of which depends on which current is stronger, a diode having its anode coupled to the control grid of one of said gate tubes to control the bias thereof, means for impressing the potential produced across one pair of said differentially connected load impedances on the cathode of said diode, a second diode having its anode connected to the control grid of the other of said gate tubes to control the bias thereof, and a connection between the cathode of said second diode and the other pair of said differential load impedances.

3. In apparatus to compare the strengths of two complex currents which are representative of two different versions of the same signal, an amplifier and detector for each version of said signal, a gate tube for each version of said signal, each gate tube having an anode and having a control grid coupled to a different one of said detectors, two pairs of rectifiers, each pair having differentially connected load impedances, connections for applying voltages representative of each version of said signal to a different rectifier of each pair to produce across the differential load impedances of each pair of rectifiers a potential the polarity of which depends on which version is stronger, a diode having its anode coupled to the control grid of one of said gate tubes to control the bias thereof, means for impressing the potential produced across one pair of said differentially connected load impedances on the cathode of said diode, a second diode having its anode connected to the control grid of the other of said gate tubes to control the bias thereof, a connection between the cathode of said second diode and the other pair of said differential load impedances, and an output circuit coupled to the anodes of the gate tubes.

ROBERT E. SCHOCK.

REFERENCES CITED

The following references are of record in the file of this patent:

UNITED STATES PATENTS

| Number | Name | Date |
|---|---|---|
| 2,293,565 | Schock | Aug. 18, 1942 |
| 2,420,868 | Crosby | May 20, 1947 |
| 2,424,833 | Korman | July 29, 1947 |
| 2,443,195 | Pensyl | June 15, 1948 |

FOREIGN PATENTS

| Number | Country | Date |
|---|---|---|
| 539,793 | Great Britain | Sept. 24, 1941 |